United States Patent
Allen et al.

(10) Patent No.: US 9,154,315 B2
(45) Date of Patent: *Oct. 6, 2015

(54) SYSTEM AND METHOD FOR MONETIZING SWITCHING OF WEB SERVICE MESSAGES

(71) Applicant: American Express Travel Related Services Company, Inc., New York, NY (US)

(72) Inventors: Clinton R. Allen, Chandler, AZ (US); Paul M. Crofts, Phoenix, AZ (US); Jeff W. Fromm, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,296

(22) Filed: Jun. 11, 2014

(65) Prior Publication Data

US 2014/0293834 A1   Oct. 2, 2014

Related U.S. Application Data

(63) Continuation of application No. 13/929,553, filed on Jun. 27, 2013, now Pat. No. 8,787,554, and a continuation of application No. 13/929,609, filed on Jun. 27, 2013, now Pat. No. 8,781,104.

(60) Provisional application No. 61/751,357, filed on Jan. 11, 2013.

(51) Int. Cl.
*H04L 12/16* (2006.01)
*H04M 3/42* (2006.01)
(Continued)

(52) U.S. Cl.
CPC ........ *H04L 12/1403* (2013.01); *G06Q 10/0639* (2013.01); *G06Q 30/00* (2013.01);
(Continued)

(58) Field of Classification Search
CPC ... G06Q 10/0639; G06Q 20/10; G06Q 30/00; G06Q 30/0226; H04L 12/1403; H04L 67/12; H04L 67/28; H04L 67/146; H04M 3/5183; H05K 999/00
USPC ............... 379/32.05, 201.01–201.03, 201.05, 379/201.12, 245–249, 265.01–265.09, 379/265.1–265.14; 370/259; 705/7.38
See application file for complete search history.

(56) References Cited

U.S. PATENT DOCUMENTS

| | | | |
|---|---|---|---|
| 8,422,641 B2 | 4/2013 | Martin, II | |
| 8,428,226 B2 | 4/2013 | Guo | |
| 8,781,104 B1 * | 7/2014 | Allen et al. | ............... 379/265.09 |
| 8,787,554 B1 * | 7/2014 | Allen et al. | ............... 379/265.09 |
| 2005/0276386 A1 | 12/2005 | Ethier et al. | |

OTHER PUBLICATIONS

USPTO: Office Action dated Dec. 6, 2013 in U.S. Appl. No. 13/929,553.
(Continued)

*Primary Examiner* — Harry S Hong
(74) *Attorney, Agent, or Firm* — Snell & Wilmer L.L.P.

(57) ABSTRACT

The present system and method comprises an improved marketplace for providing and consuming services. Using the present system, generally via one or more APIs, comprises a method for integrating value added services within a network of participants, for instance, a payment network. The network can use service switching capabilities to route service calls to and from the service consumers and providers using routing elements defined in a message specification. Network participants can be both consumers and providers of services. The network can route service messages to the appropriate provider depending on details in the message.

20 Claims, 6 Drawing Sheets

(51) Int. Cl.
   *H04M 3/51*     (2006.01)
   *H04M 3/523*    (2006.01)
   *H04L 12/14*    (2006.01)
   *H04L 29/08*    (2006.01)
   *G06Q 10/06*    (2012.01)
   *G06Q 30/02*    (2012.01)
   *G06Q 30/00*    (2012.01)
   *G06Q 20/10*    (2012.01)

(52) U.S. Cl.
   CPC ............ *G06Q30/0226* (2013.01); *H04L 67/12* (2013.01); *H04L 67/146* (2013.01); *H04L 67/28* (2013.01); *H04M 3/5183* (2013.01); *H05K 999/00* (2013.01); *G06Q 20/10* (2013.01)

(56) References Cited

OTHER PUBLICATIONS

USPTO: Notice of Allowance dated Apr. 1, 2014 in U.S. Appl. No. 13/929,553.
USPTO: Office Action dated Dec. 13, 2013 in U.S. Appl. No. 13/929,609.
USPTO: Notice of Allowance dated Apr. 25, 2014 in U.S. Appl. No. 13/929,609.
Office Action dated Jul. 3, 2014 in U.S. Appl. No. 14/302,269.
Office Action dated Oct. 8, 2014 in U.S. Appl. No. 14/302,314.
Office Action dated Oct. 20, 2014 in U.S. Appl. No. 14/302,269.
Notice of Allowance dated Apr. 21, 2015 in U.S. Appl. No. 14/302,314.

* cited by examiner

US 9,154,315 B2

SYSTEM AND METHOD FOR MONETIZING SWITCHING OF WEB SERVICE MESSAGES

RELATED APPLICATIONS

This application is the continuation of, claims priority to and the benefit of, U.S. Ser. No. 13/929,553 filed on Jun. 27, 2013 and entitled "SYSTEM AND METHOD FOR A DIGITAL NETWORK FOR SWITCHING WEB SERVICE MESSAGES." This application is also a continuation of, claims priority to and the benefit of, U.S. Ser. No. 13/929,609 filed on Jun. 27, 2013 and entitled "SYSTEM AND METHOD FOR ENABLING TRACKING OF CONTRACT PROVISIONS IN A SERVICE MESSAGE SWITCHING MARKETPLACE." The '553 application is the non-provisional of and claims priority to, and the benefit of, U.S. Provisional Patent Application U.S. Ser. No. 61/751,357 filed on Jan. 11, 2013 and entitled "SYSTEM AND METHOD FOR A DIGITAL NETWORK." All of which are hereby incorporated by reference.

FIELD

The present disclosure generally relates to providing a system and method for switching messages between network participants.

BACKGROUND

Providers of services often face roadblocks to forming relationships and developing product offerings for consumers of services due to the immense logistical roadblocks and costs which hamper new product rollout. For example, the marketplace is usually fragmented and generally lacks defined systems and conduits for service providers and service consumers to interact in a flexible, integrated, highly scalable way. The marketplace also typically lacks standardization in that many potential relationships either never materialize or are not completed because of a lack of a framework to facilitate the interaction. Moreover, many service providers often cannot devote sufficient resources, time, effort, and money to accomplish the steps that comprise integration and new service rollout. Also, service providers often cannot devote sufficient resources, time, effort, and money to accomplish the steps that comprise modifications to existing product offerings. Attempts to address these fragmentation and standardization issues include large service providers establishing a one to many solution. However, these attempts often fall short of providing a universal, end-to-end solution for all service providers to use substantially concurrently.

As such, a long felt need exists for a universal, end-to-end, automated, standards driven solution that is open to all (or a subset of) service providers and service consumers and that provides standardized tools to service providers and service consumers to mix and match their preferred offering slate.

SUMMARY

A web service is a method of communication between two electronic devices over a network, such as the Internet. This may be a software system designed to support interoperable machine-to-machine interaction over a network. The present system and method comprises an improved market place for providing and using web services and web service messages. Using the present system, generally, via one or more APIs, an entity changing service providers, and/or associated services provided, may make this change with relative ease. The present system allows authorization and trackable consumption of those services. Moreover, the present system comprises a method for integrating value added services within a network of participants, for instance, a payment network. The system can use service switching capabilities to route service calls to and from the service consumers and service providers using routing attributes appended to a message. Network participants can be both consumers and providers of services. The system can route service messages to the appropriate provider, depending on details in the message.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

DETAILED DESCRIPTION

Figure 1:
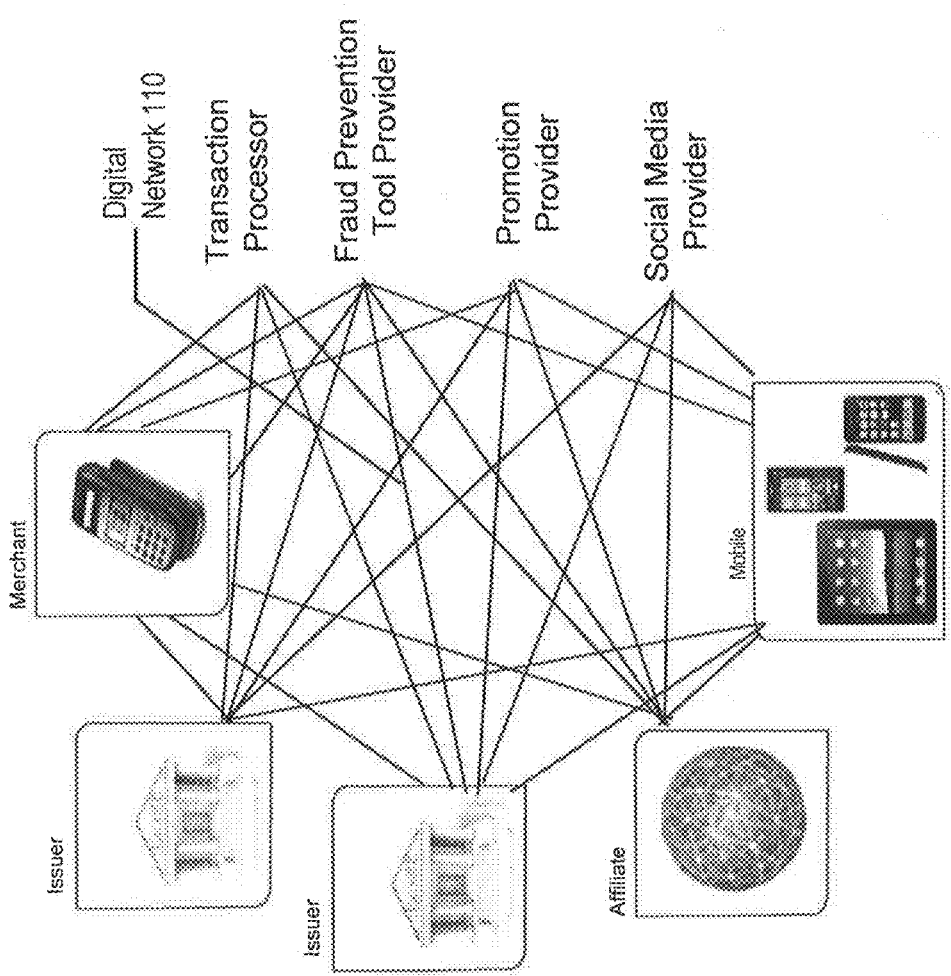
FIG. 1 is a diagram illustrating a high level design of an electronic marketplace for service providers to interact with service consumers and vice versa over a digital network, in accordance with various embodiments.

While the preferred embodiments of the present disclosure are described and illustrated herein, it will be appreciated that they are merely illustrative and that modifications can be made to these embodiments without departing from the spirit and scope of the disclosure. Thus, the disclosure is intended to be defined only in terms of the following claims.

A system 100 and method for switching web service messages is disclosed. Descriptions of specific embodiments and applications are provided only as examples and various modifications will be readily apparent to those skilled in the art. The general principles defined herein may be applied to other embodiments and applications without departing from the spirit and scope of the disclosure. Thus, the present disclosure is to be accorded the widest scope encompassing numerous alternatives, modifications and equivalents consistent with the principles and features disclosed herein. For purpose of clarity, details relating to technical material that is known in the technical fields related to the disclosure have not been described in detail so as not to unnecessarily obscure the present disclosure.

In general, a web service is a method of communication between two electronic devices over a network (e.g., the Internet). This may be a software system 100 designed to support interoperable machine-to-machine interaction over a network. The present system 100 and method comprises an improved marketplace for providing and using these services (e.g. a digital network). Using system 100, via one or more APIs, an entity changing service providers may do so with ease. System 100 is a robust network supporting revenue generating partnerships and fee-based services through configurable interfaces backed by a proven business methodology.

Digital network 110 comprises a foundational infrastructure to support a variety of use cases. Digital network 110 may serve as a marketplace of services and provide brokering capabilities thereof. For instance, use cases/services may include location based services, social media applications, financial services, loyalty programs, travel systems, consumer system, transaction services, virtual wallets, registered offers, coupons, deals, marketing systems and/or the like. These services may be mixed and matched as desired. Thus, digital network 110 substantially enables an open marketplace of services. Within this marketplace, the brokering of services may be accomplished which will also enable the monetization of switching data (e.g. routing web service messages). By adhering to a standard and substantially uniform policy and/or policies governing the digital marketplace, service providers and service consumers may seamlessly cater their product offerings as desired and scale their offering set as needed.

According to various embodiments, digital network 110 is based upon a service orientated architecture (SOA). According to the definitions controlling the SOA, federation is increased, through widespread deployment of standardized, reusable services, each of which may encapsulate a capability provided in a consistent manner. Thus, interoperability is achieved, and the technology architecture used by a service consumer is not tied to or locked to any one vender. Digital network 110 is a secure multi-tenant environment which has contracted controls over at least one of standards, capabilities, performance, security, and/or monitoring.

Via this system 100, service providers and service consumers experience streamlined processes, elimination of redundancy, and reduced operating costs. Various aspects of the present system 100 leverages cloud architecture and cloud architecture principals to create a highly scalable, elastic infrastructure which may allow for consumption based pricing and/or performance based pricing. The present system 100 is, in general, technology and language agnostic. Thus, through a single platform, partners may join and offer new services as desired to present additional opportunities for their existing customer base and growth thereof.

In contrast to the varied, silo-ed technologies offered previously and which required tremendous amounts of customization in order to allow two independent systems to interact. Digital network 110 presents a single integration model, so that participants (e.g. users/service providers/service consumers) can integrate with this single platform and utilize the variety of solutions that are offered through it. Thus, participants may make use of new services to grow their businesses provided by these other participants coupled to digital network 110. In various embodiments, a participant joining digital network 110 may select a menu of services to offer (from any other participant). Based on the capabilities provided, a participant may pay for use. In this way, risk is greatly reduced. As actual use is being monitored, tracked, and recorded (as discussed herein) a participant may have reduced risk. For instance, instead of paying a pre-negotiated fee, such as an upfront fee or an annual or quarterly fee to service providers to use services, service consumers may pay for actual use, (e.g. based on each message switched over the network). For instance, as messages traverse digital network 110 appropriate billing codes are allocated to those messages. These messages are dispatched to a clearing and settlement platform creating an automated mechanism for integrating the web service messages into billing reporting and accounting systems.

For instance, in response to a message entering into digital network 110, due to the centralized nature of this distributed system 100, business logic may be applied to each switched message. As the messages are switched within the network, information relevant to what systems (hardware and/or software) were used to switch each message may be tagged to each message. However, the switched message (and its attributes) that are exposed publicly (e.g. outside of digital network 110) is scrubbed of this contextual information. However, in various embodiments, prior to the scrubbing and generally just prior to the message being delivered out of digital network 110, the message is processed and then stored in a log/database to present a full picture, such as via XML type information, including which server processed the message, how long it took, who sent it, where was it going, confirmation the message arrived, and/or the like.

The present system 100 is not limited to a service provider interfacing over a network through an API coupled to a service consumer also coupled to the network through an API. Stated another way, the present system 100 is not limited to this one-to-one or even a one-to-many landscape. Instead, the present system 100 facilitates a many-to-many marketplace. According to various embodiments, today's service provider may be tomorrow's service consumer and vice versa.

An API may be an interface implemented by a software program which enables the API to interact with other software. An API may include a programming language that enables communication between computer programs, such as programs of a merchant and programs of a financial institution and/or third party fraud prevention provider programs. An API may be implemented by applications, libraries, and operating systems to determine vocabularies and calling conventions, and may be used to access services associated therewith. An API may include specifications for routines, data structures, object classes, and protocols for communication. An API may describe the ways in which a particular task is performed. API may define a set of request messages, along with a definition of the structure of response messages. The API may be a backward compatible API. In some cases, the API may replace the need for and/or supplement middleware.

For example, with reference to FIG. 1, this many-to-many relationship is depicted. Though particular example applications are presented, they are for example purposes only and may be substituted with other applications and service providers/service consumers.

Digital network 110 comprises established practices and principals for connecting disparate parties to support unified product offerings. For example, network principals may be foundational development and deployment philosophies to enable participant transaction processing and support product value. The systems and architecture of digital network 110 may include globally-oriented architectures designed with reusable frameworks, flexibility and scalability. These include secure, controlled connection mechanisms to manage transaction integrity. The policies and standards of digital network 110 may include leveraging expertise in creating and communicating equitable standards and policies to manage potentially conflicting interests of participants and the network. The product operations of digital network 110 may include leveraging established participant management and product execution operations, such as those known to a transaction account issuer/transaction processor for switching transactions. For instance, many of the concepts used relevant to a transaction account issuer/transaction processor may be applied to digital network 110. For instance, the concepts of reliability, secure data, data conservatorship, brand strength, quality of product offerings, user experience may be readily applied to digital network 110 framework.

Figure 2:
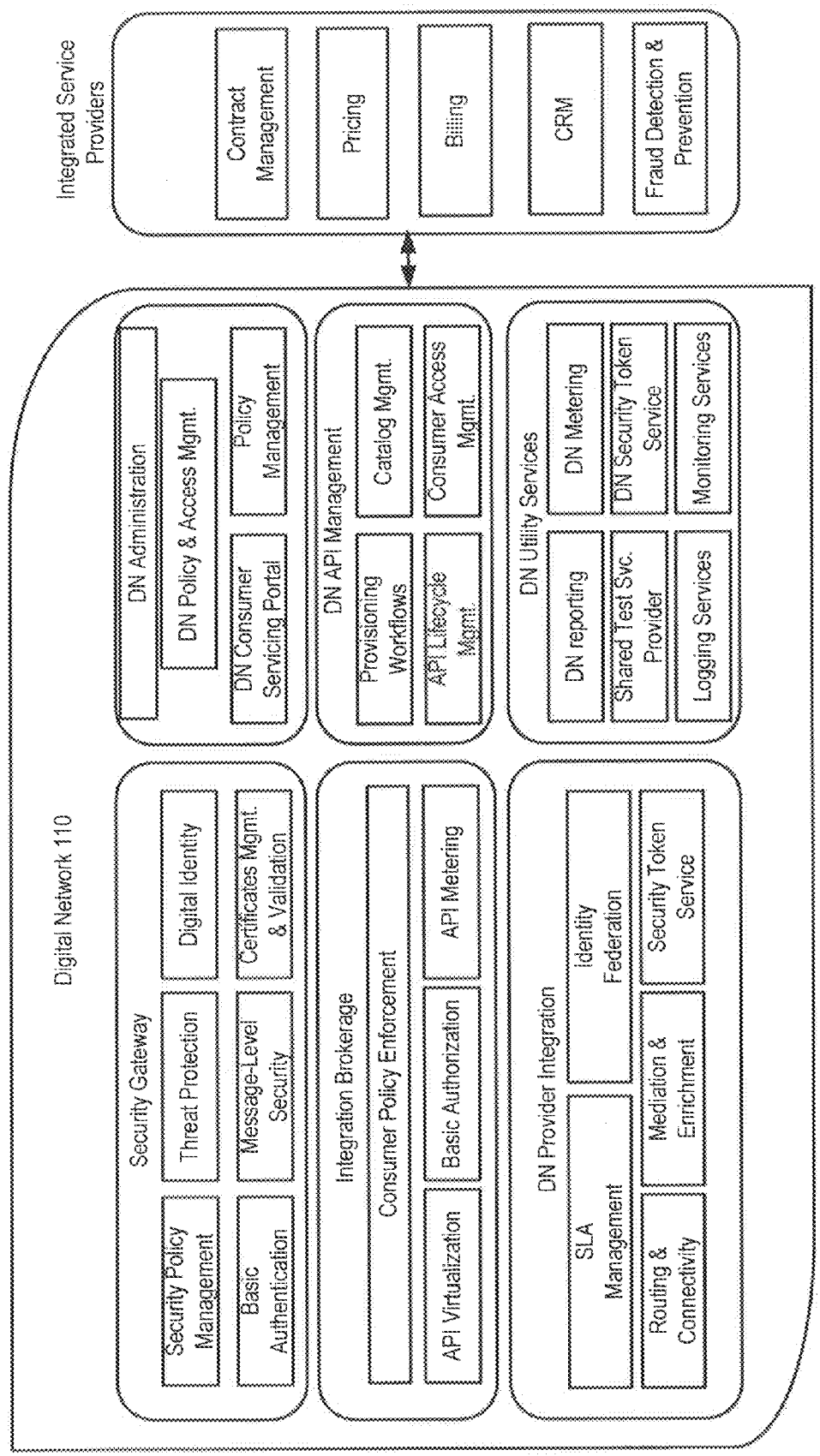
FIG. 2 is a block diagram illustrating various aspects of the digital network elements, in accordance with various embodiments.

With reference now to FIG. 2, an exemplary block diagram illustrating major system 100 components for enabling digital network 110 processes is presented. Digital network 110 employs authentication server/security gateway to validate credentials such as a digital identity, assign proper permissions, review certificates, maintain security, and retrieve preference information for authorized user's 105 of digital network 110 and/or web switching capabilities.

In various embodiments, digital network 110 employs security gateway to manage various applications and utilities that are utilized by system 100. In various embodiments application server/digital network 110 utilizes APL+Win, and JBOSS utilizing SEAM, Richfaces JBPM, and other Java libraries (jQuery and Javascript), JAX-WS, Apache POI, and Quartz. In various embodiments, digital network 110 interacts directly with the various systems and components disclosed herein.

Digital network 110 may comprise an API management engine/database. This API management engine/database may certify functionality of an API and that APIs coupled to the system 100 conform to a standard. The API management engine/database may catalog the service providers and/or service consumers coupled to digital network 110. API management engine/database may comprise templates for API creation/modification.

Digital network 110 may comprise utility services responsible for reconciliation of digital network 110 services. These duties may include metering, reporting, auditing, logging services, verifying security token use, monitoring services, and/or testing elements of digital network 110.

Digital network 110 may comprise a provider integration engine. This provider integration engine may perform service level agreement management, assist with identity federation, perform functions related to the security token and/or the like.

System 100 may include any number of computing platforms and databases such as, for example, accounting systems, financial transaction systems, reporting systems, new accounts systems, management information systems, business information systems, external data sources, proprietary systems and the like. Each of the systems may be interconnected within by a network in via any method and/or device described herein. A middleware server and/or application server 145 may serve as an intermediary between the various systems to ensure appropriate communications between disparate platforms. A report engine retrieves and/or is provided with data from the various systems in order to generate notices, bills, contracts, messages, audit reports, and the like.

Figure 3:
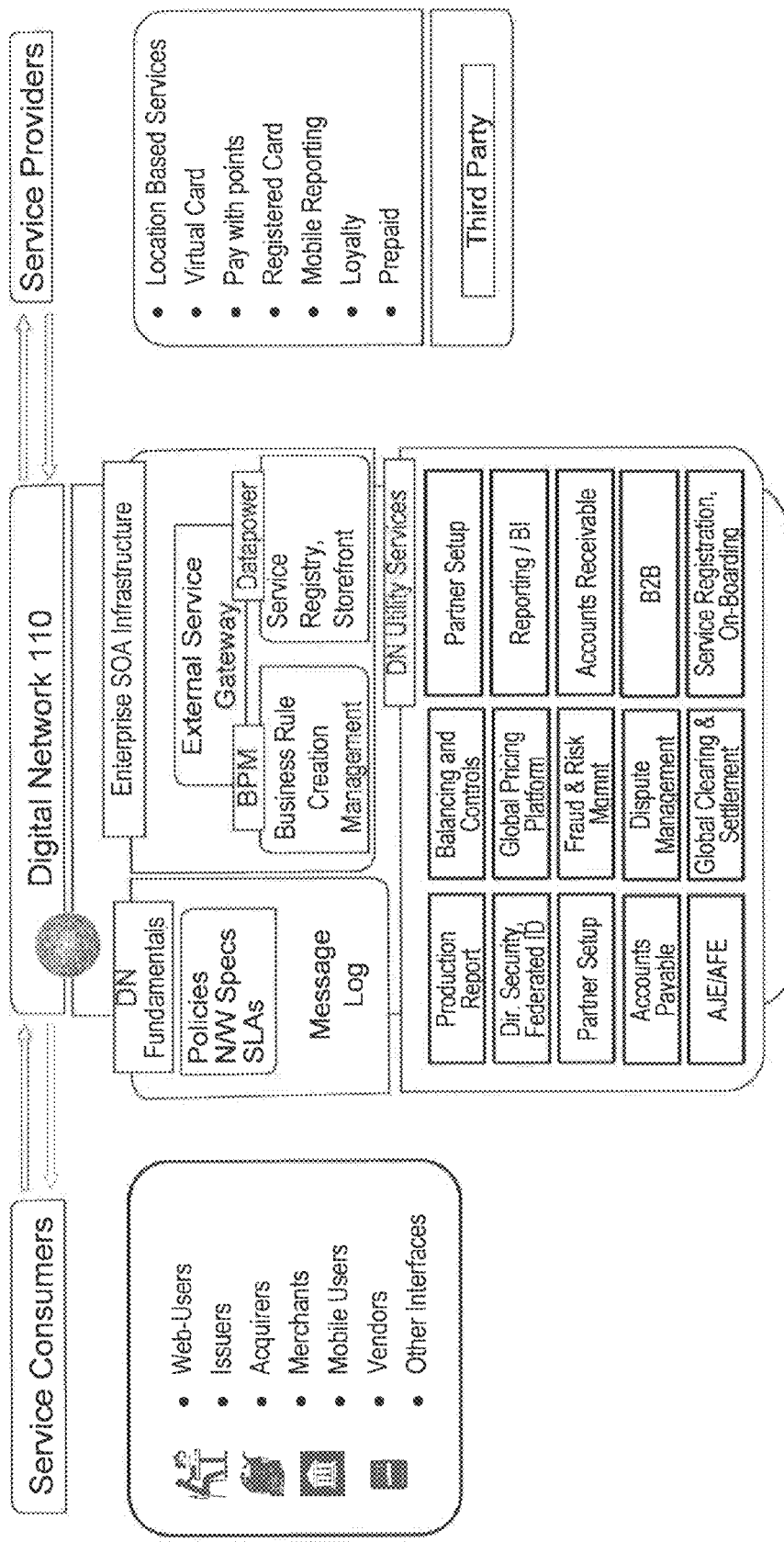
FIG. 3 is a flow chart illustrating the interaction of service providers and service consumers over the digital network, in accordance with various embodiments.

FIG. 3 is a schematic of a web service message switching system 100 generally comprising one or more consumers of web services, one or more providers of web services, and a digital network 110 (e.g. facilitator system). The consumers of web services and the providers of web services are in communication with digital network 110 via a network. The network may be the Internet, an intranet, or an extranet, for example. An extranet may be a private network connection provided exclusively among two or more parties such as dealers, wholesalers, resellers, third party service providers and/or suppliers. Digital network 100 may facilitate the substantially real-time switching of service requests, such as web service requests.

The consumers of web services may be web users, financial transaction account issuers, acquirers, merchants, mobile users, vendors, and other interfaces. The system 100 may be capable of interfacing with at least one application program interface (API). Each message switched by the system 100, is a switchable, trackable, writable message. For example, an automated journal entry and/or an automated funds exchange message may each correspond to a message switched by system 100.

The providers of web services may be any entity that offers an electronic service. These services may be querying a database, calculating formula, providing data, and/or more complex tasks such as offering location based services such as offers, discounts or services, virtual card functionality, pay with point capabilities, mobile reporting, loyalty banking, loyalty catalog services, prepaid account services and/or the like. The providers of web services may utilize backend analytics to provide services.

Figure 4:
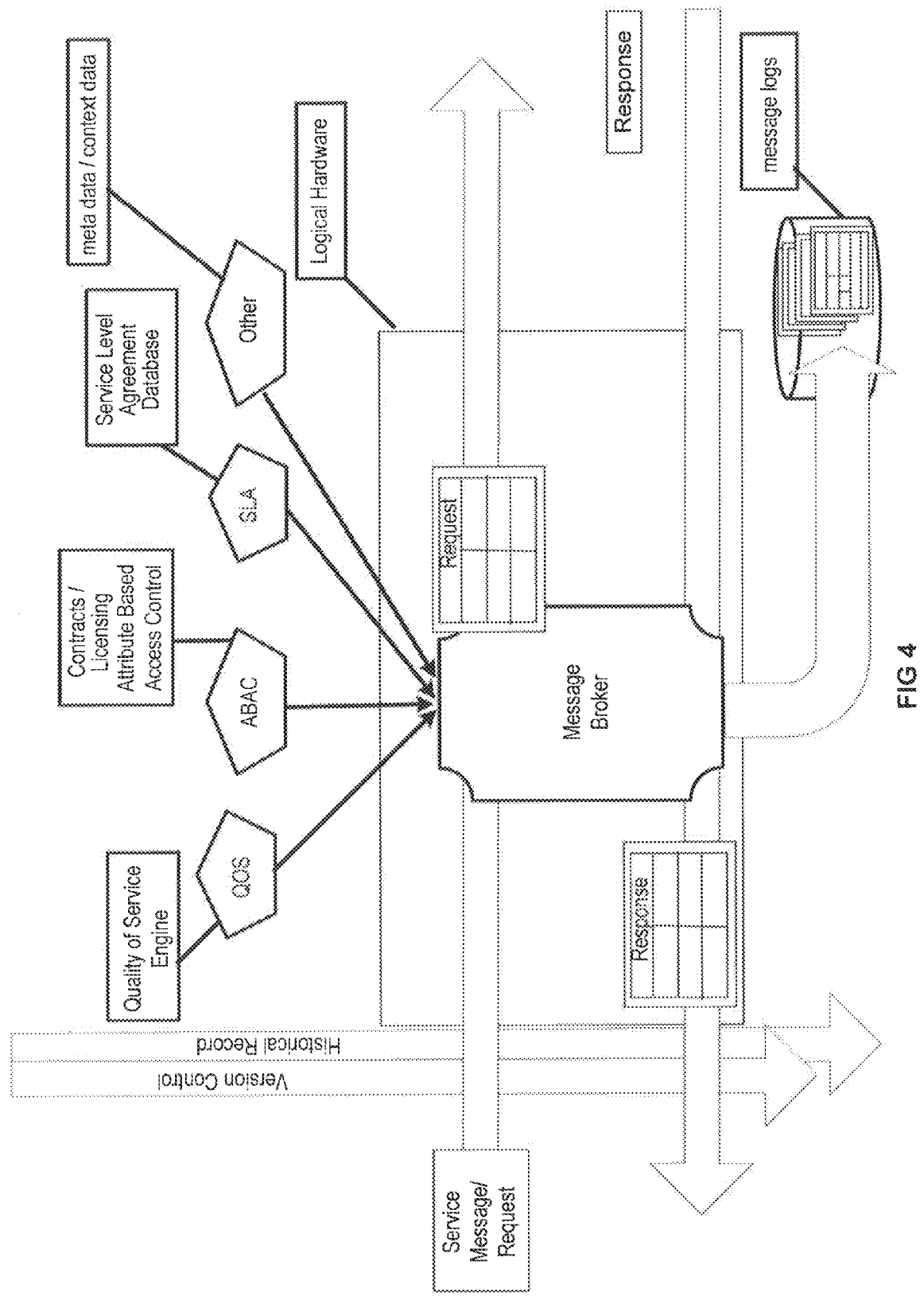
FIG. 4 is a diagram illustrating an message broker of the digital network, in accordance with various embodiments.

The tracking of the messages follows the messages that are switched through digital network 110. With reference to FIG. 4, this tracking may be facilitated by tagging the messages at various points within digital network 110, such as via a message broker. For instance, according to various embodiments, as each message enters digital network 110, leaves digital network 110 and/or traverses hardware elements of digital network 110, the switched message is appended with data to detail this path taken. This appended data may include designation identifiers of the hardware elements used in the message switching. This appended data may be metadata appended to the each message. This data may be tagged to each message. This appended data may include designation identifiers of the sender and/or the recipient of the message. =This appended data may include ordinal information, such as time to process the message, when the message entered digital network 110 and when the message was delivered to a recipient.

In concert with this tracking, a validation system of digital network 110 may confirm that the sender and/or recipient of the message are authorized to send messages over digital network 110. For instance, as described in further detail herein, this confirmation may include verifying that a service level agreement (SLA) is in place, and/or verifying the call against the terms agreed upon in a license or contract that is in place. For instance, the tracking may verify that the terms of the agreement in place are not violated. For instance, that a level of service is appropriate. This may include at least one of verifying that the volume of messages being switched within a measured period do not exceed a threshold, that the speed of the message switching is within tolerances of the agreement, that the participant is current on their payment plan and/or the like.

Prior to the message leaving digital network 110, the path taken by each message may be recorded and stored to a database and each message may be scrubbed, such as prior to consumption and/or delivery by a consumer of web services and/or providers of web services.

The present system 100 allows for authorization and trackable consumption of those services (e.g. switching messages). The system 100 provides the capability of tracking, with a high degree of granularity, cost and volume of web switched messages traversing digital network 110. Thus, a cost and volume per service may be produced and ensure that services are provided and consumed with the correct pricing scheme. These schemes may be based on each message switched, batches of switched messages, time ranges of switched messages and/or the like.

The systems 100 and methods provide an improved, tangible, integrated, online service marketplace. Various embodiments may be implemented by a system 100, computer readable medium or a method or any combination thereof. The systems 100 and methods include a unique combination of one or more features associated with a service marketplace. In various embodiments, the system 100 provides a marketplace for service providers and service consumers to engage in message switching transactions. The system 100 may be implemented as a web-based system 100 that provides a process for managing the brokering message switching transactions. The system 100 enables a one-stop resource for service providers to interact together and with service consumers, providing not only a marketplace for message switching transactions, but centralized access to service providers. In various embodiments, the system 100 references service agreements, rules of service agreements, and versions of service agreements.

Exemplary benefits of the system 100 include providing standardized integration, processes, and security to participants of digital network 110. The participants of digital network 110 benefit by the efficiency and choice created by this standardization. Service providers are better able to market and commercialize their services. Service consumer's benefit from being able to perform comparative analysis for service providers that are presented in a standardized manner. Digital network 110 provides new revenue streams to the service providers by helping to merchandise services. Moreover, efficiencies are gained by creating a community of service provider's service consumers, trusted third parties and/or brokers that transact web service messages across a common platform.

While the embodiments described herein are described in sufficient detail to enable those skilled in the art to practice the system 100 and/or method, it should be understood that other embodiments may be realized and that logical and mechanical changes may be made without departing from the spirit and scope of the disclosure. Thus, the detailed description herein is presented for purposes of illustration only and not of limitation.

For the sake of brevity, conventional data networking, application development and other functional aspects of the system 100 (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the system 100 includes various user interfaces (UI), software modules, logic engines, numerous databases and computer networks. While the system 100 may contemplate upgrades or reconfigurations of existing processing systems, changes to existing databases and system tools are not necessarily required by the system 100 and method.

While the description references specific technologies, hardware, equipment, system 100 architectures and data management techniques, practitioners will appreciate that this description is but one embodiment and that other devices and/or methods may be implemented without departing from the scope of the disclosure. Similarly, while the description may reference a user interfacing with the system 100 via a personal computer user interface, practitioners will appreciate that other interfaces may include mobile devices, kiosks and handheld devices such as personal digital assistants.

"Entity" may include any individual, consumer, consumer, group, business, organization, government entity, transaction account issuer or processor (e.g., credit, charge, etc), merchant, consortium of merchants, consumer, account holder, charitable organization, software, hardware, service provider, service consumer and/or any other entity.

An "account", "account number" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system 100. The account number may optionally be located on or associated with a rewards account, charge account, credit account, debit account, prepaid account, telephone card, embossed card, smart card, magnetic stripe card, bar code card, transponder, radio frequency card or an associated account. The system 100 may include or interface with any of the foregoing accounts or devices, or a transponder and RFID reader in RF communication with the transponder (which may include a fob). Typical devices may include, for example, a key ring, tag, card, cell phone, wristwatch or any such form capable of being presented for interrogation. Moreover, the system 100, computing unit or device discussed herein may include a "pervasive computing device," which may include a traditionally non-computerized device that is embedded with a computing unit. Examples may include watches; Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A merchant account number may be, for example, any number or alphanumeric characters that identify a particular merchant for purposes of account acceptance, account reconciliation, reporting, or the like.

A "transaction account" may include any account that may be used to facilitate a financial transaction. A financial institution or transaction account issuer includes any entity that offers transaction account services to consumers. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution, but these participants are not shown.

A "financial processor," "payment network," or "payment system" or "transaction account issuer" may include any entity which processes transactions, issues accounts, acquires financial information, settles accounts, conducts dispute resolution regarding accounts, and/or the like.

System 100, digital network 110 and/or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, a computer and/or a computer program product. Accordingly, individual system 100 components may take the form of an entirely software non-transitory embodiment, an entirely hardware embodiment, or an embodiment combining aspects of both software and hardware. In various embodiments, a system 100 component (e.g. a computer) may include a processor, a memory, a communications interface, a network interface, etc. Furthermore, individual system 100 components may take the form of a computer program product on a non-transitory computer-readable storage medium having computer-readable program code means embodied in the storage medium. Any suitable computer-readable storage medium may be utilized, including hard disks, CD-ROM, flash memory, optical storage devices, magnetic storage devices, and/or the like.

The system 100 contemplates uses in association with web services, transaction processing, utility computing, pervasive and individualized computing, security and identity solutions, autonomic computing, commodity computing, mobility and wireless solutions, open source, biometrics, grid computing and/or mesh computing.

User 105 may include any buyer, seller, service provider, service consumer, individual, customer, group of individuals, charity, cardholder, business, entity, government organization, software and/or hardware that utilizes system 100 or accesses system 100 functionality. User 105 may include, for example, a participant communicating with digital network 110, such as through an API. In various embodiments, user 105 may interface with digital network 110 via any communication protocol, device or method discussed herein or known in the art. For example, user 105 may interact with digital network 110 by way of an Internet browser at client 112.

Client 112 comprises any hardware and/or software suitably configured to facilitate requesting, retrieving, updating, analyzing, entering and/or modifying data. Client includes any device (e.g., personal computer) which communicates (in any manner discussed herein) with digital network 110 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, point of sale device, hand held computers, set-top boxes, workstations, computer-servers, main frame computers, mini-computers, PC servers, pervasive computers, network sets of computers, and/or the like. Practitioners will appreciate that client 112 may or may not be in direct contact with digital network 110. For example, client 112 may access the services of digital network 110 through another server, which may have a direct or indirect connection to digital network 110. Client 112 may be mobile or may be located in a home or business environment with access to a network. In an exemplary embodiment, access is through a network or the Internet through a commercially-available web-browser software package.

As those skilled in the art will appreciate, client 112 includes an operating system (e.g., Windows NT, 95/98/2000, OS2, UNIX, Linux, Solaris, MacOS, Android, iPhone OS etc.) as well as various conventional support software and drivers typically associated with computers or computing devices. Client 112 may include any suitable personal computer, mobile device, phone, network computer, workstation, minicomputer, mainframe or the like. Client 112 can be in a home or business environment with access to a network. In an exemplary embodiment, access is through a network or the Internet through a commercially available web-browser software package.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Client 112 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Client 112 may include any number of applications, metadata, code modules, cookies, and the like to facilitate interaction with digital network 110 in order to, for example, input data, complete templates/forms, annotate, view reports, validate data, approve data, compare activities such as to rules of a SLA and/or the like. In various embodiments, client 112 may store user 105 preferences and/or any other information disclosed herein on a hard drive or any other local memory device. Accordingly, client 112 may retrieve and store consumer information within a memory structure of client 112 in the form of a browser cookie, for example. In another embodiment, client 112 retrieves information relating to user 105 from IP marketplace 115 on establishing a session with digital network 110.

Firewall 120, as used herein, may comprise any hardware and/or software suitably configured to protect digital network 110 components from users of other networks. Firewall 120 may reside in varying configurations including stateful inspection, proxy based and packet filtering among others. Firewall 120 may be integrated as software within digital network 110, any other digital network 110 components or may reside within another computing device or may take the form of a standalone hardware component. One skilled in the art will recognize that a firewall or multiple firewalls may be implemented throughout system 100 to enable system and data security.

Digital network 110 may include any hardware and/or software suitably configured to facilitate communications between client 112 and one or more digital network 110 components. Further, digital network 110 may be configured to transmit data to client 112 within markup language documents (e.g., XML, HTML, etc.). As used herein, "data" may include encompassing information such as commands, queries, files, data for storage, and/or the like in digital or any other form. Digital network 110 may operate as a single entity in a single physical location or as separate computing components located together or in separate physical locations.

Digital network 110 may provide a suitable web site or other Internet-based graphical user interface which is accessible by users. In various embodiments, digital network 110 employs RedHat Linux Enterprise 5.x Server and Apache Http server. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to components of digital network 110, digital network 110 may invoke authentication server in response to user 105 submissions of authentication credentials received at digital network 110 from client 112. Authentication server may include any hardware and/or software suitably configured to receive authentication credentials, encrypt and decrypt credentials, authenticate credentials, and grant access rights according to privileges (e.g., pre-defined privileges) attached to the credentials. Authentication server may grant varying degrees of application and data level access to users based on information stored within a database and/or any other known memory structure. According to various embodiments, these privileges may be tied to SLAs and/or discrete rules of an SLA. Moreover, in response to a privilege being granted, a switched message may be appended with data identifying the rule and/or SLA including the exact version of the SLA associated with the granted privilege. In this way, audits may be performed, as desired, pointing to exact terms and conditions under a SLA for granting a privilege, such as a message switching privilege.

A workflow engine 148 comprises hardware and/or software modules that implement process definition, tracking and execution. Workflow engine 148 may comprise one or more software applications, modules or data objects. The software may be any executable code written in any software programming language, such as, for example Java®. For example, workflow engine 148 reads data from the various service providers and service consumers and instantiates a data object (e.g. a Java Bean®) to store the data for use by software modules or other objects. In various embodiments, workflow engine 148 executes an automated or partially automated process such as a service switching capability to route a service call. In various embodiments, workflow engine 148 enables documenting of the message switching process and tracks progress toward completion of the process, such as the routing of service calls over digital network 110.

Digital network 110 may include any hardware and/or software suitably configured to facilitate storing data relating to, for example, SLAs, promotions, tracking and status data, schedules, transactions, statements, amounts owed, payments, authentication credentials, user permissions, consumer preferences, and the like.

Figure 5:
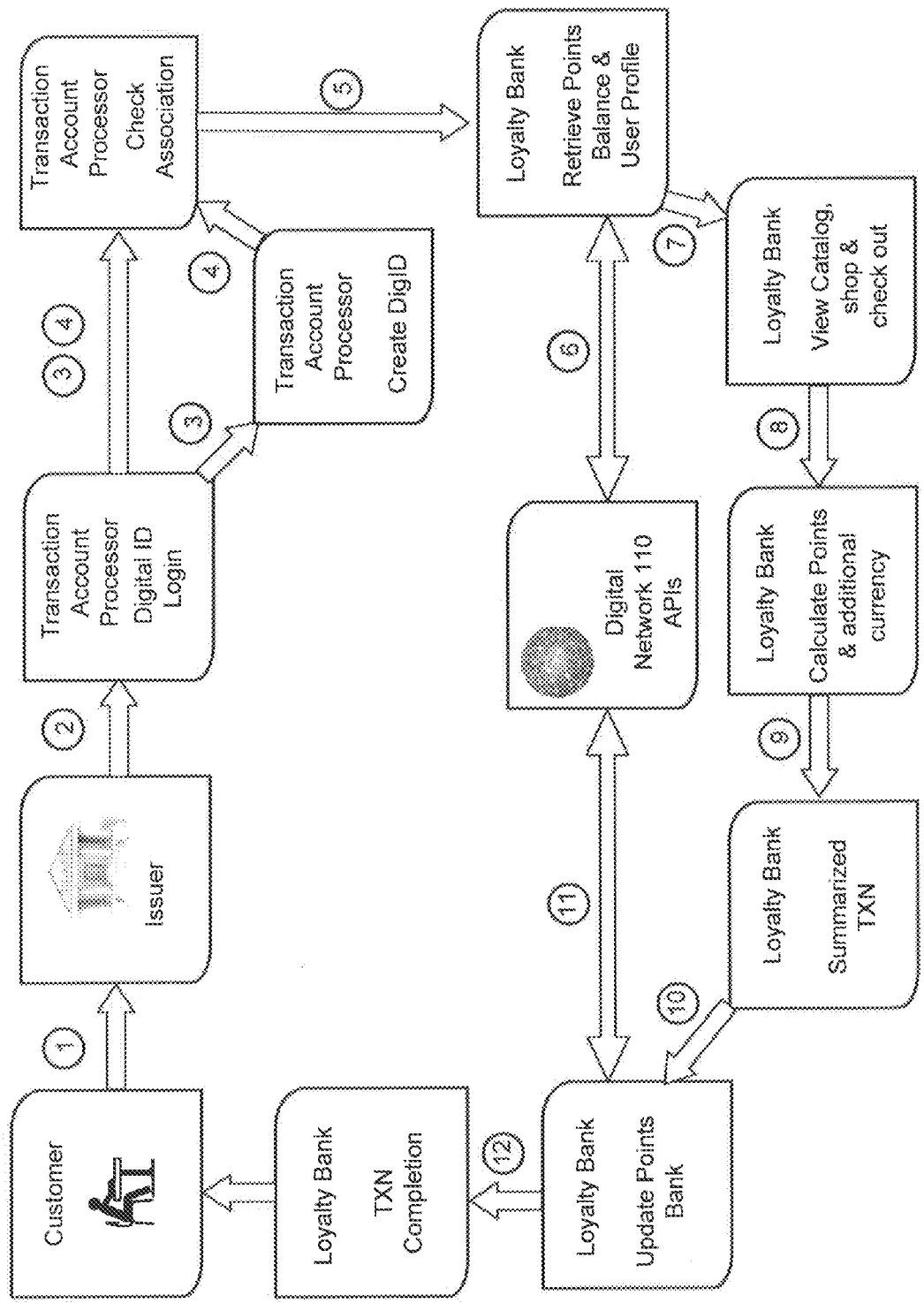
FIG. 5 is a flow diagram illustrating an exemplary use case, in accordance with various embodiments.

According to various embodiments and with reference to FIG. 5, a transaction account holder/customer may log into an issuer site and access a loyalty points bank (1). This may be a third party provider loyalty points bank, such as Loylogic. The issuer may authenticate the request and prompts for a Digital ID (2). The transaction account holder/customer may create a Digital ID if not previously registered (3). Digital Network 110 may check for association with the loyalty points bank for Digital ID provided (4). Upon approval that an association exists, such as a contractual association, Digital Network 110 transfers the request to the loyalty points bank, e.g. the loyalty points bank system (5). The loyalty points bank retrieves Points balance and User Profile through Digital Network 110 APIs (6). The loyalty points bank presents a catalogue to the transaction account holder/customer to shop and check out (7). Then, the loyalty points bank calculates points required and calculates additional currency (8). The loyalty points bank may present a summarized transaction to transaction account holder/customer to verify (9). The loyalty points bank may update Points Bank (10). The Points Bank is updated through Digital Network 110 APIs (11). The loyalty points bank completes transaction and confirms the same to transaction account holder/customer (12).

Figure 6:
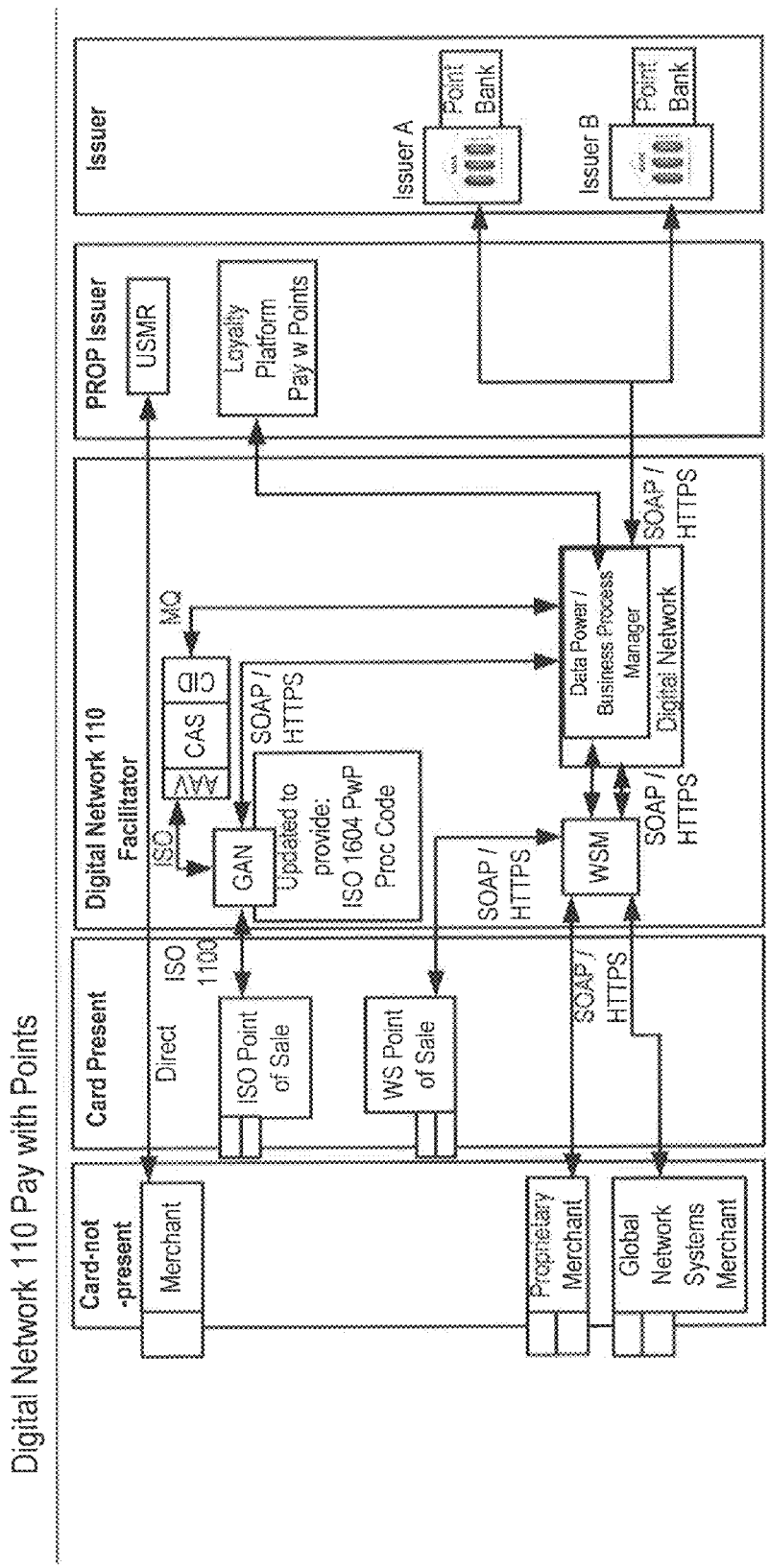
FIG. 6 is a flow diagram illustrating an exemplary use case, in accordance with various embodiments.

According to various embodiments, and with reference to FIG. 6, using aspects of the present system 100, from the customer point of view, the customer makes an election to a pay with points service by linking a loyalty membership with their transaction account. For instance, the customer may then select to pay an online merchant with alternative currency, such as over digital network 110, via an API. In this embodiment, both the merchant and the customer may be coupled to digital network 110 either directly or via a merchant portal. For example, an issuer website may provide a web based user interface to the consumer for linking loyalty points. At this point, the customer may be directed to a registration site if not previously accomplished. For example, the merchant may call digital network 110 web service requesting alternative currencies linked to the customer account. The merchant may call digital network 110 web service requesting point balance and local currency exchange rate. The digital network 110 may be associated with the central authorization system (CAS) which may be linked to address verification (AAV) and/or card security code (CID) verification services. In response, digital network 110 may call the issuer web service requesting current point balance. In response, digital network 110 may call the prearranged exchange rate. For example, digital network 110 may reference a point translation contract database to determine the current exchange rate between the issuer loyalty point system and the transaction currency. The issuer may periodically update digital network 110 with new contracts and exchange rates. Each of these calls may be one or more distinct web service switched messages. Each is appended with data to detail the sender and the recipient, and any hardware elements used, such as servers, and/or applications, used to switch the message. As messages exit digital network 110 this appended data may be removed and/or recorded, such as for invoicing.

The customer may confirm the amount of loyalty points to allocate to the purchase. In response to this confirmation, the merchant may request authorization over digital network 110. The merchant may call digital network 110 requesting authorization on a loyalty point transaction. Digital network 110 may call the issuer web service to authorize the transaction amount. The issuer may respond with an authorize or decline response. Digital network 110 may respond with an authorization or decline response.

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing privileges and/or access levels. The annotation may designate hardware systems utilized. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system 100 is frequently described herein as being implemented with TCP/IP communications protocols, the system 100 may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The system 100 and method may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices.

Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Software elements (e.g., modules, engines, etc) may be implemented as a web service. In various embodiments, web services are implemented using Webservice Interoperability Organization Basic Profile 1.1.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

The system 100 contemplates uses in association with web services, utility computing, pervasive and individualized computing, security and identity solutions, autonomic computing, cloud computing, commodity computing, mobility and wireless solutions, open source, biometrics, grid computing and/or mesh computing.

Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (or "computer-readable medium") that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

System 100 enables users 105 (e.g., digital network participant such as a service provider and/or service consumer), to interact, via routing calls and switching service messages. These switched messages may be associated with transactions for goods and services; however they are not limited to transactions of goods and services. System 100 combines unique standardization, process improvement, workflow, data integration, searching, and data security features to enable a seamless, feature-rich message switching marketplace.

Digital network 110 may invoke an authentication server 130 to verify the identity of user 105 and verify SLA permissions and/or access rights. This may include a determination of the efficiency of the systems used to process the request. In this way, based on this information retrieved by the authentication server 130, the routing of the message may be affected. For instance, a user 105 may have contracted for message switching at a set speed which can be processed by a certain class of hardware, such as a tiered class of hardware. To access the application server 145 or other components of digital network 110, Internet server 125 may invoke an authentication server 130 in response to user 105 submissions of requests for routing service calls being received by digital network 110. When a request to access system 100 is received from Internet server 125, Internet server 125 determines authentication from the sender credentials and/or characteristics of the message. When user 105 is authenticated, user 105 may access various applications and their corresponding data sources. This access may be restricted only to certain aspects of digital network 110. For instance, certain service providers may have contracts to interact with a set of service consumers. For instance, a transaction account transaction processor may offer a loyalty point bank to their members. These members may be able to spend the loyalty points at a specific online catalog. This online catalog may be one of many catalogs coupled to digital network 110. Based on the SLA, digital network 110 based on this information retrieved by the authentication server 130 may route the various services calls to the proper service providers. Note, in the above example, the transaction account transaction processor is a service consumer of the loyalty point bank service provider; the loyalty point bank service provider is a service consumer of the online catalog service provider. As can be seen, the roles of service requestor and service provider may be designated by the entity requesting and providing data respectively.

According to various embodiments, a service consumer may desire the use of a membership points redemption service. Instead of a plurality of users, such as a plurality transaction account issuers leveraging a single point redemption service, the present system allows for multiple membership point catalog providers. In this way, the issuers would be able to have choice with whom they would like to integrate and offer services. Thus, after a new SLA is put in place the system 100 allows for competition between those providers, a marketplace of services. Based on the framework of digital network 110 and, in general, APIs between the service providers and service consumers and the standardization, in this case, the issuer is able to switch between the service providers (e.g. the multiple membership point catalog providers) without changing their integration. In this way an issuer (e.g. service consumer and service provider) may "shop around" as to what services they want to utilize to offer their products. Due to the standardization of the interfaces and the framework, not only may a service consumer switch between similar service providers which offer similar services, but a service consumer may add, remove, or exchange services offered with ease. For instance, an issuer whom has historically offered a loyalty points catalogue service to its members may toggle to offering a partnership with a frequent flier system with relatively little difficulty. The system 100 makes it easier for partners to consume services, without the need to integrate different services individually, which saves the participants time and money.

According to various embodiments, digital network 110 manages the services offered at the network level rather than individually from the service providers to reduce the demands on the users.

Participants in digital network 110 may conform to a standard, such as a standard similar to an ISO standard. This standard may define technical details such as defining layout of a participant's interfaces, and/or define business process, such as defining penalties for not meeting obligations. This may be limited to the participant's API layout or to participant's back end services. According to various embodiments, the standard may be used as a template for developing an API for interfacing with digital network 110. According to various embodiments the system 100 does not use commercial XML (CXML). According to various embodiments, the on-boarding process for participants includes a certification process. This certification process may help ensure that participants can actually provide the services they represent they can provide. It may include a test phase and/or warranties for non-performance. The on-boarding process may include do a technical certification that their compliance to the standard.

According to various embodiments, fees may be assessed on the transactions (e.g. switch messages) that flow across digital network 110. These fees on integration messages may be assessed on all switched messages that traverse the network or a subset of messages that flow across digital network 110. For instance, these messages may be or may not be financial in nature. Thus, these feed messages can be non-financial messages. As an example, a non-financial message may be a message where there is no exchange of money associated with the message. A facilitation fee for facilitating the movement of messages across the network may be assessed.

According to various embodiments a service consumer, such as a global exchange and clearinghouse for virtual currencies such as loyalty points or miles (e.g. LoyLogic), have a user may desire to make a purchase via a catalog. Interacting with an issuer's website, the user may from the virtual catalog, request a call from a points bank. In this way, the catalog calls the points bank. However, the user's identity is provided across the network without actually exposing the credentials of the user. Thus, the system 100 leverages passing data regarding the user's credentials and the date without actually exposing the user's credentials such as by offering tokens with stand in the place of sensitive data. This secure transfer of information over digital network 110 is applicable to any web switching message that traverses digital network 110.

In this way, the issuer may assert what can be done against that token as far as what permissions the user has with respect to the services offered they wish to leverage for their membership and digital network 110 may be able to control execution of those permissions within the network. In this way, digital network 110 controls that privacy is being honored. Thus, the identity of the user is protected and the security of digital network 110 is protected. Also, the privacy and the compliance requirements around the user's transaction account information are secure.

This is in contrast to a typical service oriented solution by shifting the logic around network protection into the network space. For instance, typically, you would have a service provider and all of the authorization/permissions would be held at the service provider, such as, who has access to what permissions. The present system 100 moves that high level logic out of the service provider application into digital network 110. In the scenario where a message is moving across the network, where the message is being sent and the security around all the different participants is carefully controlled by the system 100.

According to various embodiments, identification of fraud risk prevention can be increased and broadened. For instance, with traditional fraud risk prevention there is generally a substantial data storage that feeds into a system that understand spending behavior nature and payment behavior taking into account, velocity checks, historical patterns and the like. In contrast, digital network 110 facilitates capture of real-time transactional information as it is moving across digital network 110 and stores it in a database in real time. For instance, a user may use a Pay with Points service and/or virtual wallet service each of which is facilitated via digital network 110. A fraud prevention service provider may also be a participant on digital network 110. These may all be linked to a user links via digital network 110. A message may be communicated to digital network 110 participant and/or service consumers that there is a potential fraudulent activity associated with a user. All participants consuming that fraud service may benefit from the information and take action as appropriate. Similar scenarios with respect to credit alerts are contemplated.

According to various embodiments, a social media application such as Open Table or Yelp may include a community of people discussing how they like a restaurant or product offerings. An offer system provided through digital network 110, leveraging analytics, may present the best offers, from a merchant perspective and/or from an issuer perspective, such as how much money does this person traditionally spend on restaurants, or is it the right offer? Depending on the API's a service consumer is partnered with multiple benefits and cross-leveraging of services may be achieved. For instance, depending on the various participants, a percent off or the amount of a bill and/or bonus points may be deposited into a loyalty point bank and/or into a virtual wallet system in response to acceptance of an offer or writing a review. For instance, in response to a star ranking and/or review provided by a user on a restaurant ranking system coupled to digital network 110, such as Yelp, a service provider coupled to digital network 110 may present an offer such as a Registered Card offer or Groupon offer at similar class, geographically relevant, restaurants, depending on which service providers each user and/or service consumer is contracted with to leverage.

Due to the framework of digital network 110, (e.g. the network is in the middle) and the policies and security models in place to protect the user data and the on-call privileges, digital network 110 can enforce on-call principles at the network level. Thus, digital network 110 is able to control and dictate, based on the attributes of each message, that a service consumer may call upon data, such as from any provider coupled to the digital network. Digital network 110 can block requests they are not on-call compliant based on the attributes of the request.

According to various embodiments, users are verified to digital network 110. For instance a user requests a digital ID. The user may be certified prior to being issued a Digital ID. Once issued a digital ID the user may use their registered Digital ID and request switching of service call messages over digital network 110. The user may register for digital network services. This may entail registering and signing a licensing agreement to use services from service providers. These licensing agreements may be word documents and/or coded rules. Access to aspects of digital network 110 may depend on compliance with these documents and/or specific coded rules.

Due to the security framework of digital network 110, data is protected between participants of digital network 110. Thus, any one participant is not able to see the data of any other participant.

According to various embodiments, a participant need not reconfigure their existing interfaces and structure to interface with digital network 110. Instead, an additional API may be inserted between the existing interface of the participant and digital network 110 so to maintain the unified cohesive marketplace of services. A non-exhaustive list of participants of digital network 110 may include, digital prepaid account, such as Serve, acquirers, issuers, risk mitigation, monetization providers, loyalty account providers, geo-location based offers, registered card offers, analytics, currency exchanges, social media providers, customer relationship management providers, internet merchants, complete merchant solutions, credit bureaus, travel services, transportation access, mobile applications and/or mobile application developers. For instance, additional details regarding these service providers that may be participants and the services provided may be appreciated from U.S. Ser. No. 13/411,281 entitled "System and Method for Providing Coupon-less Discounts Based on a User Broadcasted Message" filed Mar. 2, 2012; U.S. Ser. No. 12/874,063 "API Based Fraud Mitigation" filed on Sep. 1, 2010; and U.S. Ser. No. 13/540,216 entitled Systems and Methods for Transferring Value via a Social Network" filed on Jul. 2, 2012; the disclosures of each are incorporated herein by reference in their entirety for any purpose.

According to various embodiments, in response to a transaction occurring on digital network 110, accurate risk fraud calculations based on analytics and/or VI analytics may be made with regard to the user. For example, a customer shopping at a mall may imitate a transaction with a store, where the transaction is processed via digital network 110. The store identifier and/or point of sale device may indicate to digital network 110 the location of the user. In response to receiving this information the back-end system of digital network 110 may initiate calculations on the risk of the transaction (being fraudulent, default, etc.). For instance, the calculations may include the internal data, such as a customer's payment history, purchase history, amount of membership reward points and/or the like. Digital network 110 may cross-reference a database which stores merchant offers and perform a real time calculation to determine success or probability of relevance of a unique offer specifically customized for this customer. For instance, the customer may receive a message on their phone to go to a geographically nearby merchant and use membership reward points to redeem purchase of a specific item and receive a discount.

Each service provider partnered with digital network 110 may be cross-referenced to create services for users. For instance, loyalty services may be combined with risk and/or a fraud services. Marketing campaigns may be combined with analytics of credit risks. These relationships may hone campaigns. For instance a marketing campaign may not be sent to a user who is currently at risk at default. Digital network 110 and its framework allows for relatively easy combination of services. In essence, according to various embodiments, participants of digital network 110 may mix and match the services desired and/or consumed and orchestrate them together to create experiences that wouldn't be possible with traditional the one to one relationships. In another example, a work flow and sales force may integrate with and use information from Facebook and/or other social media applications. Thus, digital network 110 can add and consolidate services by utilizing multiple third-party service providers.

Internal data is any data a credit issuer possesses or acquires pertaining to a particular consumer. Internal data may be gathered before, during, or after a relationship between the credit issuer and the consumer. Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also for example, transaction vendor/merchant location may include a particular web address, such as a Uniform Resource Locator ("URL"), an email address and/or an Internet Protocol ("IP") address for a vendor/merchant. Transaction vendor/merchant location may also include information gathered from a WHOIS database pertaining to the registration of a particular web or IP address. WHOIS databases include databases that contain data pertaining to Internet IP address registrations. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit.

Internal data may further comprise records of consumer service calls, complaints, requests for credit line increases, questions, and comments. A record of a consumer service call includes, for example, date of call, reason for call, and any transcript or summary of the actual call.

Internal data may further comprise closed-loop data and open-loop data. Closed-loop data includes data obtained from a credit issuer's closed-loop transaction system. A closed-loop transaction system includes transaction systems under the control of one party. Closed-loop transaction systems may be used to obtain consumer transactional data. Open-loop data includes data obtained from a credit issuer's open-loop transaction system. An open-loop transaction system includes transaction systems under the control of multiple parties.

Participants in digital network 110 may earn loyalty points for switching messages via digital network 110 or any of the other processes disclosed herein. The system also facilitates redeeming these loyalty points for value and/or discounts.

According to various embodiments, a computer-based method of the present system 100 may include receiving a request to route a service call message from a requestor to a service provider through an API within an electronic marketplace of service providers and service consumers, (e.g. digital network 110). Digital network 110 may verify privileges of the requestor to request services from the service provider. Digital network 110 may tag the service call message with data indicating the results of the verifying. Digital network 110 may store the tags of the service call message to a database. After storing, digital network 110 may scrub the tags of the service call message. Digital network 110 may route the service call message to the service provider in response to positive verification that the requestor may request services from the service provider and based on the attributes of the service call message. Digital network 110 may audit, at any time, the efficiency of the routing of the first and second call messages, such as to verify that the routing occurs within SLA tolerances and/or agreed upon rates.

According to various embodiments, digital network 110 may receive a response to the routed service call message such as through an API. Similar to the request, digital network 110 may verify privileges of the service provider to deliver services to the requestor. Digital network 110 may tag the response to the service call message with data indicating the results of the verifying. Digital network 110 may tag the response to the service call message with data identifying the requestor of the service call message, information identifying an intended recipient of the service call message, information identifying an actual recipient of the service call message, information identifying a time of an origination of the request, and/or information identifying a time of the delivering the request to the actual recipient. Digital network 110 may store the tags of the response to the service call message to a database which is separate from storing the tags to the message itself. Digital network 110 may store the tags of the response to the service call message to the message itself. Digital network 110 may store the tags of the response to the service call message to the database, instead of saving the tags to the service call message. Digital network 110 may scrub the tags of the response to the service call message. Digital network 110 may route the response to service call message to the requestor, in response to positive verification that the service provider may provide services to the requestor and based on the attributes of the response to the service call message.

Digital network 110 may partially or fully secure the identity of the requestor from the marketplace of service providers and service consumers. According to various embodiments, only digital network 110 and the initial requestor have access to this information. A fee is assessed to the requestor and/or to the recipient for routing the service call message. The fee for routing the service call message to the requestor may be based on a pro-rated cost of hardware elements used to switch each message. The fee for routing the service call message to the requestor may be based on a defined cost of each hardware element used to switch each message. If a participant wishes for faster and/or more efficient resources they may contract for these resources, and the messages may be switched by servers and processors that meet the contract provisions. These may carry increased fees, as compared with other resources available. The verifying may involve comparing the attributes of the request to a specific rule of an agreement. Digital network 110 may tag information which identifies at least one of the rule, the agreement, and a version of the agreement. Digital network 110 may dynamically switch service level agreements to verify against, as changes to service level agreements are accessible to the digital network computer/system 100. The marketplace of service providers and service consumers may include disparate and/or similar third party service providers and service consumers. The frameworks of the APIs described herein may conform to a standard. Digital network 110 may tag the message with at least one of the identification of the hardware elements and software processing used to deliver the service call message from the requestor to the service provider.

Digital network 110 may append a token comprising proxy attributes to the service call message. This may be in place of any data such as metadata. This metadata, token, and/or appended data may be encrypted using techniques described and referred to herein.

According to various embodiments, the request may be received through a first API and the request may be routed to the service provider through the same first API. Such is the case where a merchant is requesting its own data via digital network 110. The on-boarding of service providers and/or service consumers to the electronic marketplace may include a certification process. Each service call message may be routed based on on-call privileges of digital network 110. In this way, the service consumer's message may be directed to any entity that performs a service so long as the proper permissions are in place. This functionality may open up competition for services where roadblocks existed previously.

According to various embodiments, the requestor and/or service provider may earn loyalty points for requesting to route the service call message via digital network 110. This may be based on fees paid for use of digital network 110, on a per message switched basis, exceeding benchmarks, not violating a license or contract within a certain period, user reviews, based on batches of messages and/or the like. A second service provider coupled digital network 110 who was not the recipient of the routed message may use the information of the service call message to transmit a second service call message to the requestor. This may be to an anonymous recipient as the identity of the member may be secure.

In various embodiments, digital network 110 comprises a plurality of application programming interfaces (APIs). The APIs enable digital network 110 to interface with various systems (e.g. a third party application). API specifications may be open or proprietary. Digital network 110 may include a plurality of API's enabling third party and/or external applications to access the services of the marketplace and to build their own integrated channels. According to various examples, a participant may build custom applications (a.k.a., "apps") that access the capabilities of digital network 110 via APIs.

In various embodiments, digital network 110 framework enables a participant to configure and offer promotions via digital network 110. For example, service providers (that run social media based restaurant table reservation systems) may wish to increase usage of their service. The service provider may configure a promotion on digital network 110 such that the terms of the promotion are advertised to digital network 110 users and/or a subset of selected digital network users. Promotions may be configured via a promotions configuration interface and/or via a promotion API. Digital network 110 receives a promotion setup request and parses the request into promotion parameters. Promotion parameters may include, for example, criteria for whom the promotion is offered to, criteria for the timing of the promotion, a reward associated with a promotion, criteria for qualifying for the reward, etc. Digital network 110 may associate promotion parameters with one or more channels and may save the promotion (e.g. to a promotion database). In various embodiments, digital network 110 may determine system entities (service providers and/or service consumers) that comply with first promotional criteria (as identified in the promotion parameters) and send a notice of the promotion to such entities. Sending the notice may include sending a promotion solicitation via an email message, a link, a uniform resource locator (URL), a customized web page, a social networking web site, an app, a text message and a mobile application. In various embodiments, users that are being offered a promotion receive notice of the promotion via the channel guide interface. For example, the channel associated with the interface may be displayed with an indicator (e.g. a color, a graphic, text, etc) to inform the user that the channel is offering a promotion.

As used herein, references to "switching messages," "switched messages," "switching web service messages," "service switching capability," and "routing service calls" may be used interchangeably.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A computer-based method comprising:
receiving, by a digital network electronic marketplace computer and via a first API, a request to route a service call message from a service consumer to a service provider within an electronic marketplace of service providers and service consumers;
tagging, by the digital network computer, the service call message with data indicating attributes of the routing;
storing, by the digital network computer, the tags of the service call message to a database;
scrubbing, by the digital network computer, the tags of the service call message from the service call message;
routing, by the digital network computer and through a second API, the service call message to the service provider based on the attributes of the service call message; and
assessing, by the digital network computer, a fee to the service consumer for processing the request to route the service call message from the service consumer to the service provider based on the stored tags of the service call message.

2. The method of claim 1, further comprising securing the identity of the service consumer from the marketplace of service providers and service consumers.

3. The method of claim 1, further comprising:
receiving, by the digital network computer and via the second API, a response to the routed service call message;
verifying, by the digital network computer, privileges of the service provider to deliver services to the service consumer;
tagging, by the digital network computer, the response to the service call message with data indicating the results of the verifying;
storing, by the digital network computer, the tags of the response to the service call message;
scrubbing, by the digital network computer, the tags of the response to the service call message; and
routing, by the digital network computer and through the first API, the response to service call message to the service consumer in response to positive verification that the service provider may provide services to the service consumer and based on the attributes of the response to the service call message.

4. The method of claim 1, further comprising tagging, by the digital network computer, at least one of information identifying the service consumer of the service call message, information identifying an intended recipient of the service call message, information identifying an actual recipient of the service call message, information identifying a time of an origination of the request, or information identifying a time of the delivering the request to the actual recipient.

5. The method of claim 1, further comprising, verifying, by the digital network computer, privileges of the service consumer to request services from the service provider.

6. The method of claim 5, wherein the verifying further comprises comparing the attributes of the request to a rule of an agreement.

7. The method of claim 6, further comprising tagging, by the digital network computer, the identification at least one of the rule, the agreement, or a version of the agreement.

8. The method of claim 1, wherein the marketplace of service providers and service consumers are disparate third party service providers and service consumers.

9. The method of claim 1, wherein a fee is assessed for each service call message processed by the digital network computer.

10. The method of claim 1, wherein the fee is assessed based on the stored tags of the service call message after the scrubbing of the tags of the service call message.

11. The method of claim 1, wherein the framework of the first API and the second API conforms to a standard.

12. The method of claim 1, further comprising tagging, by the digital network computer, at least one of the identification of the hardware elements or software processors used to deliver the service call message from the service consumer to the service provider.

13. The method of claim 12, further comprising assessing a fee for routing the service call message to the service consumer based on a pro-rated cost of hardware elements used to switch each message.

14. The method of claim 1, wherein the first API and the second API are the same API.

15. The method of claim 1, wherein the on-boarding of service providers to the marketplace includes a certification process.

16. The method of claim 1, wherein each service call message may be routed based on on-call functionality of the digital network computer.

17. The method of claim 1, wherein the service consumer earns loyalty points for requesting to route the service call message from the service consumer to the service provider within the electronic marketplace of service providers and service consumers.

18. The method of claim 1, wherein a second service provider coupled to the electronic marketplace of service providers and service consumers who was not the recipient of the routed message may use the information of the service call message to transmit a second service call message to the service consumer.

19. An electronic marketplace system comprising:
an electronic marketplace of service providers and service consumers;
a service consumer coupled the electronic marketplace of service providers and service consumers via a first API;
a service provider coupled the electronic marketplace of service providers and service consumers via a second API; and
a digital network electronic marketplace processor, wherein the digital network processor receives a request to route a service call message from the service consumer to the service provider within the electronic marketplace of service providers and service consumers,
wherein the digital network processor tags the service call message with data indicating attributes of the routing,
wherein the digital network processor stores the tags of the service call message to both a database and to the service call message, wherein the digital network processor scrubs the tags of the service call message from the service call message, wherein the digital network processor routes, via the second API, the service call message to the service provider based on the attributes of the service call message, and wherein the digital network processor assesses a fee to the service consumer for processing the request to route the service call message from the service consumer to the service provider based on the stored tags of the service call message.

20. A non-transitory computer-readable storage medium having computer-executable instructions stored thereon that, in response to execution by an electronic marketplace computer, causes the computer perform operations comprising:

receiving, by a digital network computer and via a first API, a request to route a service call message from a service consumer to a service provider within an electronic marketplace of service providers and service consumers;

tagging, by the digital network computer, the service call message with data indicating attributes of the routing;

storing, by the digital network computer, the tags of the service call message to a database;

scrubbing, by the digital network computer, the tags of the service call message from the service call message;

routing, by the digital network computer and through a second API, the service call message to the service provider based on the attributes of the service call message; and assessing, by the digital network computer, a fee to the service consumer for processing the request to route the service call message from the service consumer to the service provider based on the stored tags of the service call message.

* * * * *